(12) United States Patent
Quinn

(10) Patent No.: US 8,147,172 B2
(45) Date of Patent: Apr. 3, 2012

(54) DRILLING JIGS

(75) Inventor: Peter Quinn, Doeset (GB)

(73) Assignee: Joint Genie Limited, Dorset (GB)

( * ) Notice: Subject to any disclaimer, the term of this patent is extended or adjusted under 35 U.S.C. 154(b) by 676 days.

(21) Appl. No.: 11/918,637

(22) PCT Filed: Apr. 12, 2006

(86) PCT No.: PCT/GB2006/001315
§ 371 (c)(1),
(2), (4) Date: Dec. 29, 2008

(87) PCT Pub. No.: WO2006/109046
PCT Pub. Date: Oct. 19, 2006

(65) Prior Publication Data
US 2009/0191015 A1 Jul. 30, 2009

(30) Foreign Application Priority Data

Apr. 13, 2005 (GB) .................................. 0507437.2

(51) Int. Cl.
*B23B 47/28* (2006.01)
(52) U.S. Cl. .................................. 408/115 R; 408/72 R
(58) Field of Classification Search .............. 408/115 R, 408/72 R; *B23B 47/28*
See application file for complete search history.

(56) References Cited

U.S. PATENT DOCUMENTS

| 4,257,166 | A | * | 3/1981 | Barker et al. | 408/241 G |
|---|---|---|---|---|---|
| 4,753,557 | A | * | 6/1988 | Besnier | 408/115 R |
| 5,056,966 | A | * | 10/1991 | Lee | 408/115 R |
| 5,064,319 | A | * | 11/1991 | Ericksen | 408/115 R |
| 5,174,693 | A | * | 12/1992 | Lee et al. | 408/108 |
| 5,807,036 | A | * | 9/1998 | Lostlen | 408/97 |
| 2002/0106253 | A1 | * | 8/2002 | Coleiro | 408/3 |
| 2006/0210367 | A1 | * | 9/2006 | Liu | 408/115 R |
| 2006/0251481 | A1 | * | 11/2006 | Behman | 408/115 R |
| 2009/0274527 | A1 | * | 11/2009 | Quinn | 408/115 R |

FOREIGN PATENT DOCUMENTS

GB       2158747 A  * 11/1985
WO   WO 2005023470 A2  *  3/2005

* cited by examiner

*Primary Examiner* — Eric A Gates
(74) *Attorney, Agent, or Firm* — J.Wiley Horton

(57) ABSTRACT

Drilling jigs consisting of a first substantially rectilinear bar (2) having a plurality of through holes (4) through which holes can be drilled in a surface, and a plurality of locator members (6, 7, 8) which are rotatable relative to one or other of the surfaces of the bar (2) other than those through which holes are to be drilled, the jigs further including a second substantially rectilinear bar (17) with a plurality of through holes (17) through which holes can be drilled in a surface, and securing means (12, 13) for securing the first and second bars to each other, the holes in the first and second bars through which holes are drilled being substantially in alignment when they are secured together with the securing means.

7 Claims, 4 Drawing Sheets

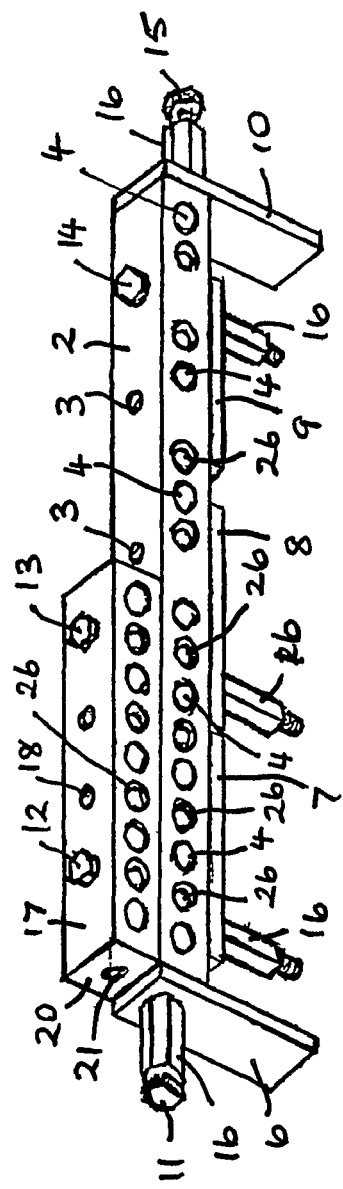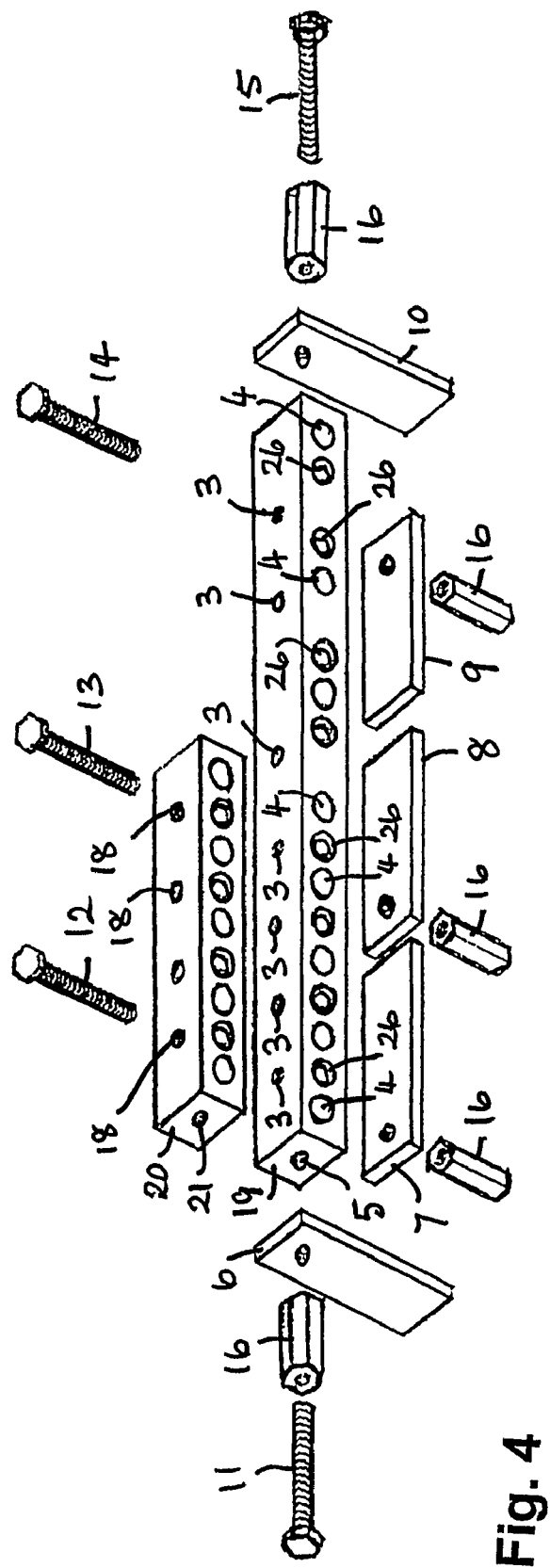

DRILLING JIGS

CROSS-REFERENCES TO RELATED APPLICATIONS

Figure 1:
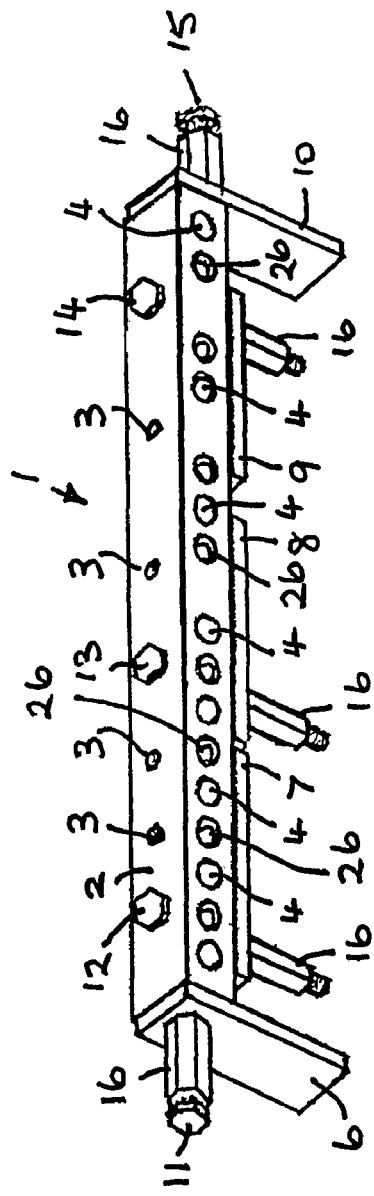

This application is a U.S. National Stage application filed pursuant to 35 U.S.C. §371. Pursuant to the cited section and the Patent Cooperation Treaty, priority is claimed to International Application No. PCT/GB06/001315 having a priority date of Apr. 13, 2005.

STATEMENT REGARDING FEDERALLY SPONSIRED RESEARCH OR DEVELOPMENT

Not applicable.

MICROFICHE APPENDIX

Not applicable.

This invention concerns drilling jigs particularly for the drilling of holes in wood and wood based workpieces.

Numerous types of drilling jigs have been proposed hitherto.

One such type of hitherto proposed drilling jigs include those described in U.S. Pat. No. 4,257,166, which consist of plates with through holes through which holes are drilled, the plates being positioned relative to a workpiece by edge plates secured on threaded rods screwed into the plates with the holes.

Another type of drilling jig is described in U.S. Pat. No. 4,752,162, this consisting of two L-section members adjustably connected by a rod, one arm of each of the L-section members having through holes through which holes can be drilled in a workpiece, the L-section members being clamped to a workpiece during the drilling process.

A yet further type of drilling jig consist of a substantially rectilinear bar with a series of through holes through which desired holes are drilled, and one or more adjustable locating members for locating the jigs relative to a workplace. Examples of such jigs are described in DE29605747-U, FR2303648-A, U.S. Pat. No. 4,474,514 and WO2005/023470.

The problem with such jigs is that although single rows of holes can be satisfactorily drilled using many of them, particularly those with a pluralities of drilling holes and comprehensively adjustable locating members, for example as described in WO2005/023470, there are situations in which it is desired to produce two or more substantially parallel rows of holes at a predetermined spacing between the rows.

According to the present invention there is provided a drilling jig comprising:—
 a first substantially rectilinear bar having a plurality of through holes having a predetermined spacing along the bar, through which holes can be drilled in a surface, and a plurality of locator members which are rotatable relative to one or other of the surfaces of the bar other than those through which holes are to be drilled;
 a second substantially rectilinear bar having a plurality of through holes having a predetermined spacing along the bar through which holes can be drilled in a surface, and
 securing means for securing the first and second bars to each other, the through holes in the first and second bars through which holes of drilled being substantially in alignment when the two bars are secured together with the securing means, the securing means including a plurality of bores at predetermined space intervals along both bars through which securing devices are able to pass to secure the two bars together, the bores being perpendicular to the said through holes to enable the through holes of each bar to be aligned selectively with the through holes of the other bar with their respective axes aligned either, in space parallel relationship, axially or perpendicular to each other.

Drilling jigs in accordance with the present invention of enable single rows of holes to be drilled accurately in workpieces at predetermined distances from edges of the workpieces, and they also enable at least one further row of holes to be produced at predetermined distances from the first row and with a predetermined pitch between holes in the respective rows.

In addition, jigs in accordance with the present invention can be used to produce two or more rows of drilled holes at arbitrary positions with respect to a workpiece.

An embodiment of drilling jig in accordance with the present invention will now be described with reference to the accompanying drawings in which:—

Figure 2:
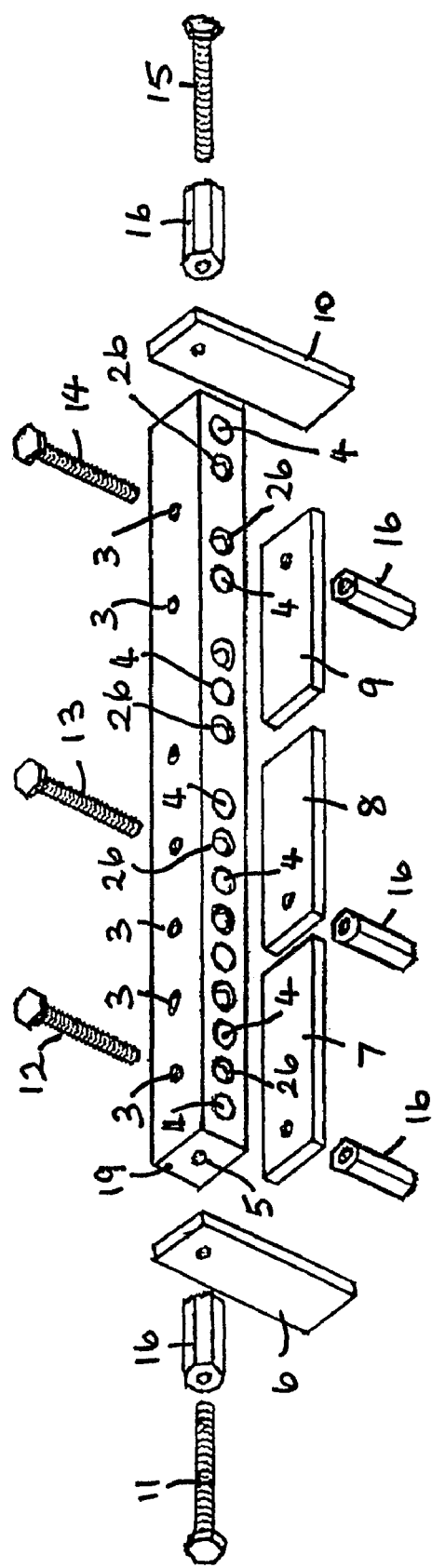
Figure 5:
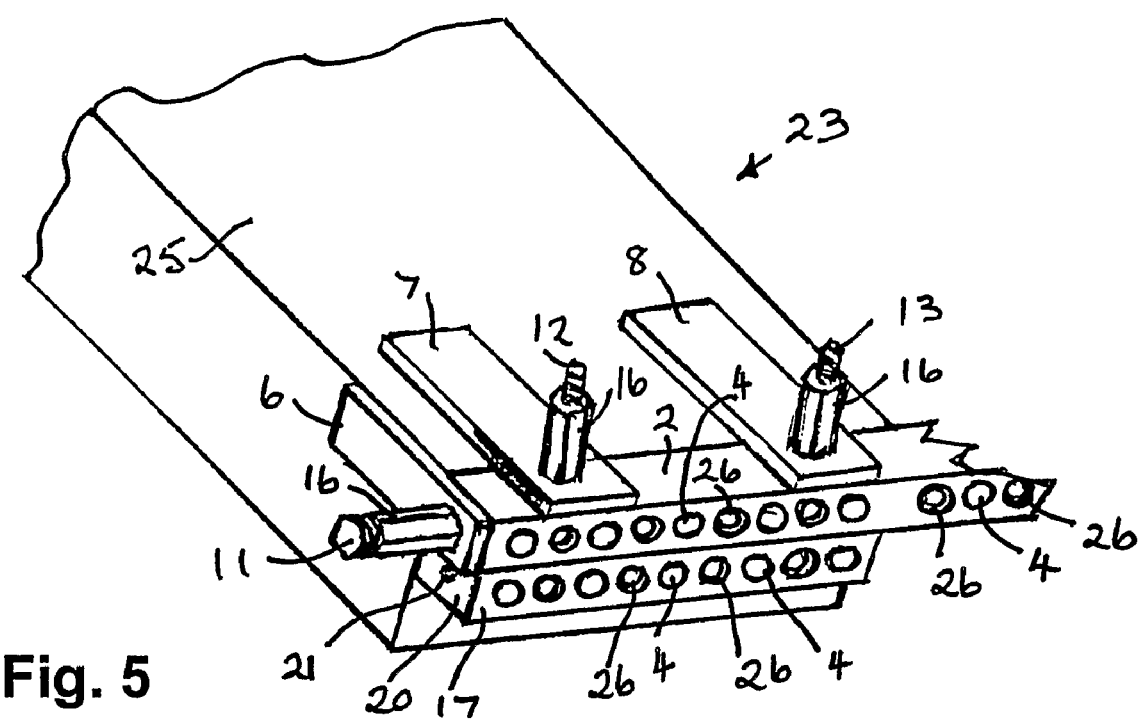
Figure 6:
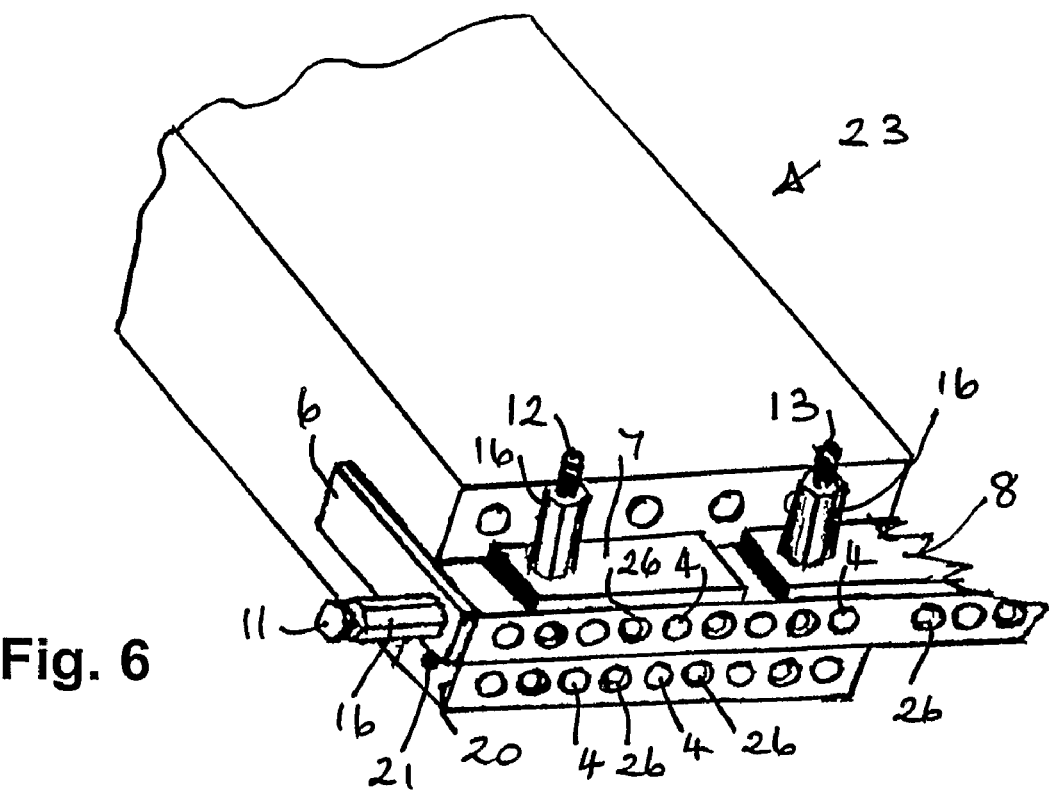
Figure 7:
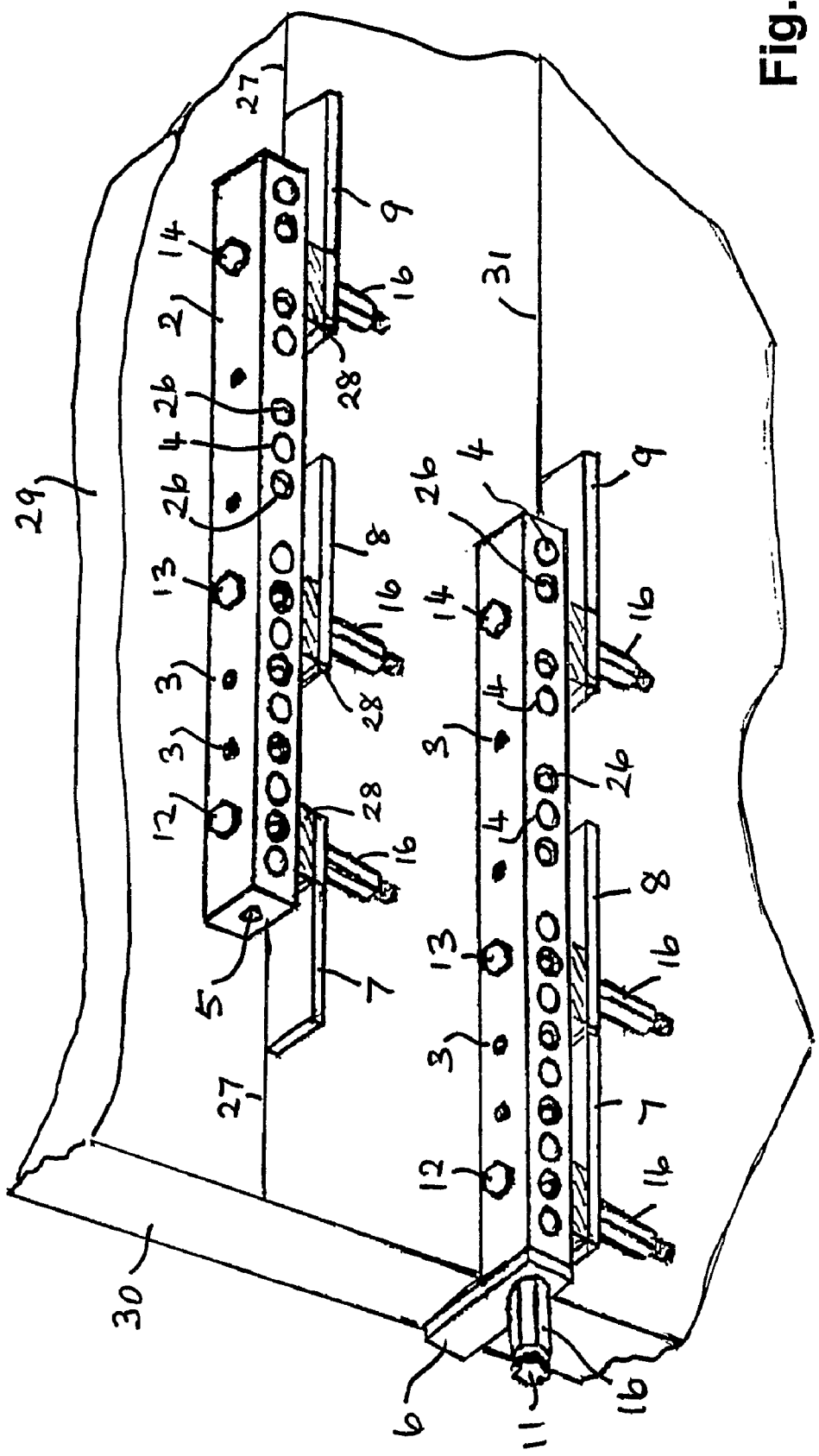

FIG. 1 shows a portion of the jig in its assembled state;
FIG. 2 is an exploded view corresponding to FIG. 1;
FIG. 3 shows the complete jig in its assembled state;
FIG. 4 is an exploded view of the jig as shown in FIG. 3;
FIG. 5 shows the jig in position for drilling holes in the end of a workpiece;
FIG. 6 corresponds to FIG. 5 with the jig repositioned for drilling further sets of holes in the workpiece; and
FIG. 7 shows the portion of the jig shown in FIG. 1 in two different position on a workpiece and including further components.

The portion 1 of the jig shown in FIGS. 1 and 2 consists of a rectangular section bar 2, with a plurality of through holes 3 from one face of the bar 2 to its opposite face, and a further plurality of through holes 4 passing between the two remaining faces of the bar 2. Holes 5 in the ends of the bar 2 are threaded for reasons which will subsequently be explained.

Five rectangular plates 6, 7, 8, 9 and 10 are connected to the bar 2 by bolts 11, 12, 13, 14 and 15 respectively, the bolts 11, 12 and 13 passing through holes 4 in the bar 2, and the bolts 14 and 15 being threaded into the holes 5 in the bar 2. The plates 6, 7, 8, 9 and 10 are free to rotate on their respective bolts until hand tightenable elongate nuts 16 on the bolts 11, 12, 13, 14 and 15 are tightened.

The nuts 16 are shown as being of hexagonal section, but they can have other cross sections, for example they can be substantially cylindrical with axially extending grooves to give improved grip when tightening the nuts 16 by hand.

The rectangular plates 6 7 8, 9, and 10 each have one dimension which is substantially that of the face of the bar 2 to which they are attached. This enables the plates 6, 7, 8, 9, and 10 to be rotated relative to the bar 2 so that they do not project beyond this face of the bar 2.

Referring now to FIG. 3, the bar 2 is shown attached to an auxiliary bar 17, the bar 17 having a rectangular section which substantially the same as that of the bar 2.

Through holes 18 from one face of the bar 17 to its opposite face are in alignment with through holes 3 in the bar 2 so that bolts 12 and 13 can be used to attach the auxiliary bar 17 to the bar 2 with the other faces of the auxiliary bar 17 in the same plane as the other faces of the bar 2, and with the end faces 19 and 20 of the bars 2 and 17 respectively also in substantially the same plane.

The end faces 20 (only one being shown) of the bar 17 have threaded holes 21 therein for receiving bolt 11 plus an elongate nut 16, and retaining the plate 6 or a further, similar plate on the end of the bar 17.

The assembled jig as shown in FIG. 3 can be used to drill holes in workpieces through holes 4 in both of the bars 2 and 17 by suitably rotating one or more of the plates 6, 7, 8, 9 and 10 relative to the bars 2 and 17, securing the plates using the nuts 16, and then positioning the jig relative to the workpiece using the bars 2 and 17 and the plates 6, 7, 8, 9 and 10.

FIG. 5 shows the drilling jig in a first position on the end of a workpiece 23 with plate 6 contacting one surface 24 of the workpiece 23, and the two plates 7 and 8 contacting an adjacent surface 25 of the workpiece 23.

Holes are then drilled through holes 4 in the bars 2 and 7 as desired, the two bars enabling holes to be drilled in the workpiece 23 in two rows.

Further rows of holes can then be drilled in the workpiece 23 at the same pitch as those produced with the jig in the position shown in FIG. 5 by rotating the plates 7 and 8 into alignment with the bar 2, and re-positioning the bars 2 and 17 as shown in FIG. 6. The bars 2 and 17 are then held in this position by the plate 6 and dowels inserted through holes in the bar 2 and into holes which had previously been drilled through the auxiliary bar 17.

Further rows of holes can be produced by similar movements of the bars 2 and 17 relative to the workpiece 23 and securing them in new positions using dowels through holes 4 in the bar 2.

The illustrated drilling jig can also be used to produce rows of drilled holes at positions in workpieces which are not necessarily relative to edges of the workpieces. In order to effect this, the bars 2 and 17 have countersunk through holes 26 which can be used to secure the bars to a workpiece with screws passed through these holes. Further series of holes in rows parallel to each other can then be produced by locating the jig in new positions using dowels passed through holes 4 in bar 2 into holes drilled in the workpiece through holes 4 in the bar 17.

Alternative methods of use of drilling jigs in accordance with the present invention can be seen with reference to FIG. 7 which omits the auxiliary bar 17.

The upper view of the jig in FIG. 7 shows it with plate 6 removed and the plates 7 and 9 aligned with a reference line 27 on a workpiece 29. In addition, three spacers 28 are positioned between the plates 7, 8 and 9 and the bar 2, this enabling holes to be drilled in the workpiece 29 at a larger distance from the line 27 than if they had not been present.

The lower view of the jig in FIG. 7 is similar to that of the upper view but with the plate 6 in place and abutting edge 30 of the workpiece 29 and with its lower edge aligned with a further reference line 31, the upper surface of the plate 9 being aligned with line 31.

The auxiliary bar 17 as shown in FIG. 7 can be connected to the bar 2 in a similar manner to that shown in FIG. 4.

It will also be appreciated that spacers 28 can be positioned between the plates 7 and 8 and the bar 2 of FIGS. 5 and 6.

Drilling jigs in accordance with the present invention can be used on a variety of surfaces, including new and existing furniture units, walls, etc.

The invention claimed is:

1. A drilling jig comprising:
    a first substantially rectilinear bar having a plurality of through holes through which holes can be drilled in a surface, and a plurality of locator members which are rotatable relative to one or other of the surfaces of the bar other than those through which holes are to be drilled;
    a second substantially rectilinear bar having a plurality of through holes through which holes can be drilled in a surface;
    securing means for securing the first and second bars to each other, the holes in the first and second bars through which holes are drilled being substantially in alignment when they are secured together with the securing means; and
    wherein the second bar is shorter than the first bar.

2. A drilling jig according to claim 1, wherein the second bar has means for pivotally connecting a locator member to one or both ends thereof in planes substantially perpendicular to the plane in which the locator members are rotatable relative to one or other of the surfaces of the bar.

3. A drilling jig according to claim 1, including countersunk holes substantially parallel to the holes through which holes in surfaces are to be drilled.

4. A drilling jig according to claim 1, including means for securing the jig to a substantially planar surface.

5. A drilling jig according to claim 1, including spacers for increasing the distance between the locator members and the said one or other surfaces of the bar to which they are connected.

6. A drilling jig according to claim 1, including manual means for securing the locator members relative to the first bar.

7. A drilling jig comprising:
    a first substantially rectilinear bar having a plurality of through holes through which holes can be drilled in a surface, and a plurality of locator members which are rotatable relative to one or other of the surfaces of the bar other than those through which holes are to be drilled;
    a second substantially rectilinear bar having a plurality of through holes through which holes can be drilled in a surface;
    securing means for securing the first and second bars to each other, the holes in the first and second bars through which holes are drilled being substantially in alignment when they are secured together with the securing means; and
    a plurality of spacers clamped between said first and second bars by said securing means in order to space said second bar a predetermined distance apart from said first bar.

* * * * *